US012798272B2

(12) United States Patent
Connell et al.

(10) Patent No.: US 12,798,272 B2
(45) Date of Patent: Nov. 17, 2026

(54) PRINTER, FOOD PRODUCT SCALE AND ASSOCIATED LABEL CASSETTE WITH ADJUSTABLE LABEL STOCK EDGE GUIDE

(71) Applicant: ILLINOIS TOOL WORKS INC., Glenview, IL (US)

(72) Inventors: Hugh A. Connell, Evesham (GB); Robert Andrew Holmes, Worcester (GB); Ian D. Taylor, Warwickshire (GB); Randall L. Redman, Beavercreek, OH (US); Austin Knoblauch, Centerville, OH (US); Kevin Cartwright, Halesowen (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 215 days.

(21) Appl. No.: 18/756,706

(22) Filed: Jun. 27, 2024

(65) Prior Publication Data

US 2026/0001362 A1 Jan. 1, 2026

(51) Int. Cl.

| | |
|---|---|
| ***B41J 15/04*** | (2006.01) |
| ***B41J 3/407*** | (2006.01) |
| ***B41J 3/44*** | (2006.01) |

(52) U.S. Cl.

CPC ........... *B41J 15/046* (2013.01); *B41J 3/4075* (2013.01); *B41J 3/445* (2013.01); *B41J 15/044* (2013.01)

(58) Field of Classification Search

CPC ........ B41J 15/046; B41J 3/4075; B41J 3/445; B41J 15/044

USPC .................................................. 347/221, 232

See application file for complete search history.

(56) References Cited

U.S. PATENT DOCUMENTS

| | | | | |
|---|---|---|---|---|
| 8,517,618 | B2 | 8/2013 | Cartwright | |
| 2003/0159603 | A1 * | 8/2003 | Lee ........................ | B65H 23/02 101/228 |
| 2005/0036816 | A1 | 2/2005 | Carriere et al. | |
| 2008/0191012 | A1 * | 8/2008 | Monnier .............. | G07G 1/0063 235/385 |
| 2015/0022611 | A1 | 1/2015 | Taylor et al. | |
| 2022/0161579 | A1 * | 5/2022 | Shiohara ................ | B41J 15/044 |
| 2025/0367950 | A1 | 12/2025 | Cartwright et al. | |

FOREIGN PATENT DOCUMENTS

| | | | |
|---|---|---|---|
| CN | 214646918 | U | 11/2021 |
| JP | H08295422 | A | 11/1996 |
| JP | 2001310847 | A | 11/2001 |

OTHER PUBLICATIONS

Avery Berkel, XTi/XTs Series Service Instructions Manual, ABR35-000660-AG, Aug. 24, 2022, 95 pages.

* cited by examiner

*Primary Examiner* — Jason S Uhlenhake
*Assistant Examiner* — Alexander D Shenderov
(74) *Attorney, Agent, or Firm* — THOMPSON HINE LLP

(57) ABSTRACT

A printer includes a media path along which labels are movable, and a printhead positioned along the media path. At least a part of the media path includes a side structure defining a first side of the part of the media path and a media edge guide for defining a second side of the part of the media path, wherein the media edge guide is movable so as to adjust a spacing between the media edge guide and the side structure for accommodating different media widths. A guide adjustment assembly connected to the media edge guide for providing tool-free manual movement of a position of the media edge guide to adjust the spacing.

16 Claims, 7 Drawing Sheets

PRINTER, FOOD PRODUCT SCALE AND ASSOCIATED LABEL CASSETTE WITH ADJUSTABLE LABEL STOCK EDGE GUIDE

TECHNICAL FIELD

This application relates generally to scales used for weighing food product in supermarkets, groceries and other stores and printing labels, and, more particularly, to a scale type printer including a label cassette with an adjustable label width guide.

BACKGROUND

In typical commercial food product scale applications the scale is used to weigh food products and determines prices for the food products, and an associated printer prints a label for application to the food product. An operator enters a product number, such as a PLU (price look-up) number, for the product being weighed and the scale accesses its database, or accesses a remote database, for pricing information on the product. The total price for the item is then determined based upon its weight. Price can also be determined based upon item count. In either case, the food product scale typically prints a label with the price and other information for the product.

Different label sizes can be used in the food product scale, which in some cases results in the need to accommodate different label stock widths. Similarly, other devices, such as printers, can accommodate different widths of label stock or other media. As used herein, the term printer encompasses both devices that function solely or primarily as printers, as well as other devices that include a printer function but also include other functions in addition to printing, such as a weighing scale that also prints labels. Such scales and other printers can include label stock or other media cassettes that are removable for the purpose of replacing or changing the label stock or other media loaded into the cassette. Label cassettes used in prior printers have included a label stock edge guide having a clamp with a small screw that was used to fix the guide in place in a position suitable for the label stock (or other media) width being used. The screw required use of a tool to be loosened, which is needed anytime the guide requires position adjustment.

It would be desirable to provide a scale (or other printer) and associated label (or other media) cassette with a more user-friendly arrangement for adjusting the position of a stock edge guide.

SUMMARY

In one aspect, a printer includes a media path along which labels are movable, and a printhead positioned along the media path. At least a part of the media path includes a side structure defining a first side of the part of the media path and a media edge guide for defining a second side of the part of the media path, wherein the media edge guide is movable so as to adjust a spacing between the media edge guide and the side structure for accommodating different media widths. A guide adjustment assembly connected to the media edge guide for providing tool-free manual movement of a position of the media edge guide to adjust the spacing.

In embodiments, the printer is formed as a scale, and the media is a label stock (liner type or linerless).

In another aspect, a printer includes a printer body, and a media cassette removable from the printer body. The media cassette includes a media path along which labels are movable. At least a part of the media path includes a side structure defining a first side of the part of the media path and a media edge guide for defining a second side of the part of the media path, wherein the media edge guide is movable so as to adjust a spacing between the media edge guide and the side structure for accommodating different media widths. A guide adjustment assembly connected to the media edge guide for providing tool-free manual movement of a position of the media edge guide to adjust the spacing, wherein the guide adjustment assembly comprises a rotatable spring.

The details of one or more embodiments are set forth in the accompanying drawings and the description below. Other features, objects, and advantages will be apparent from the description and drawings, and from the claims.

DETAILED DESCRIPTION

Figure 1:
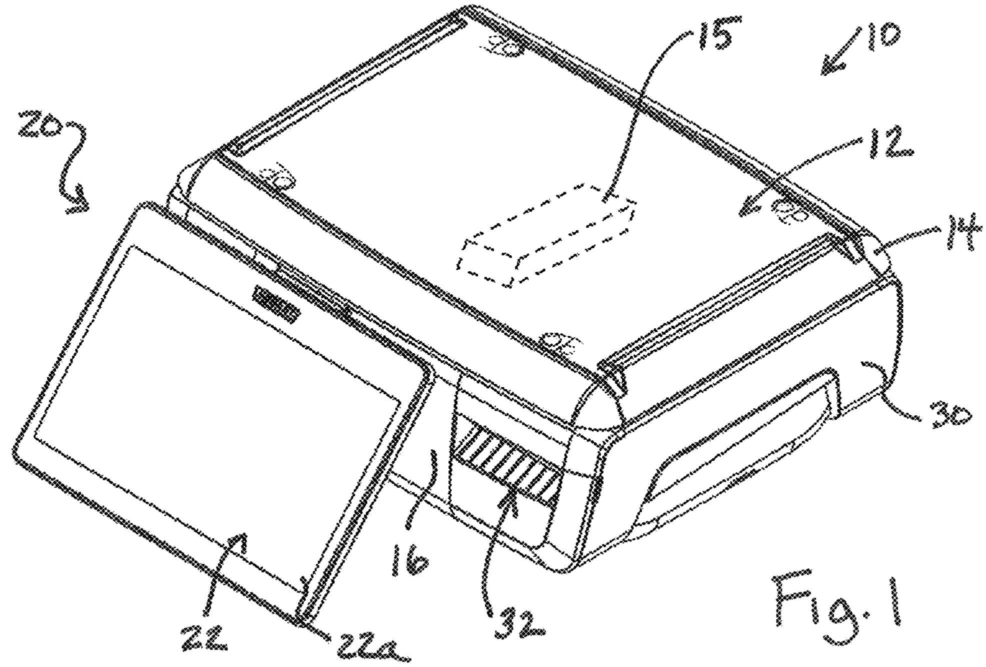
FIGS. 1 and 2 show perspective views of a scale.
Figure 2:
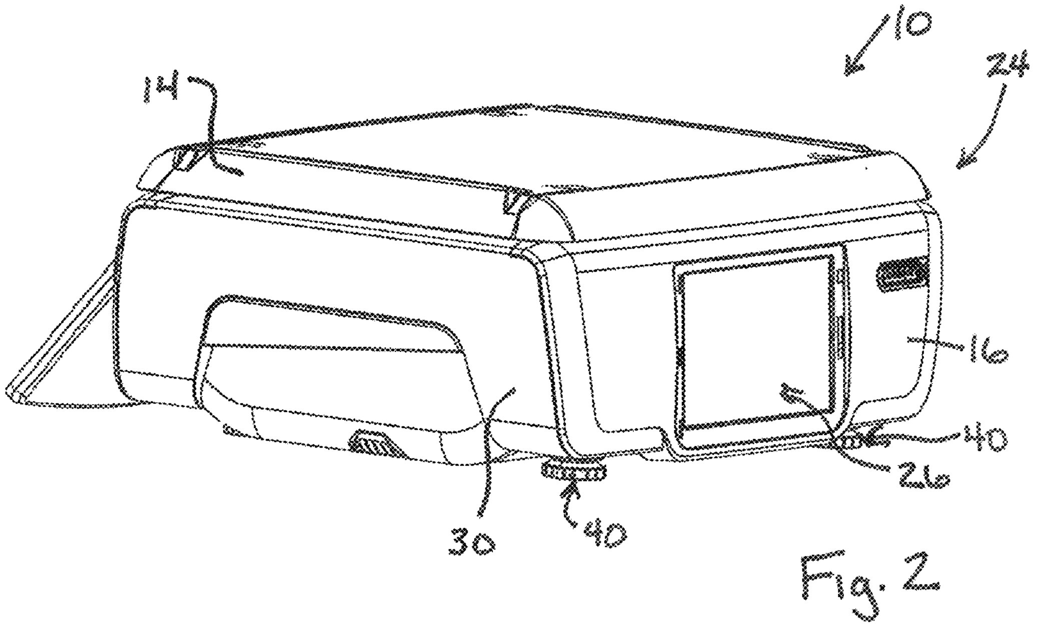
Figure 3:
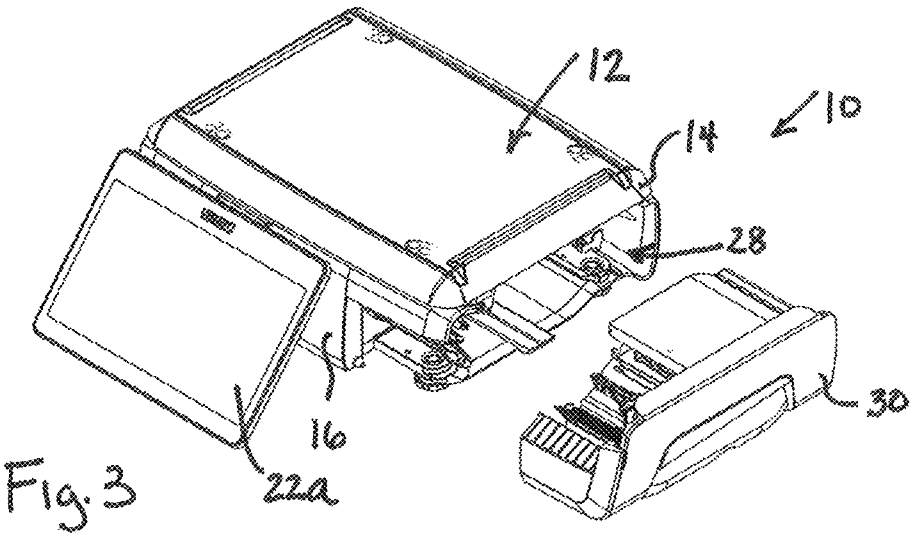
FIG. 3 shows a perspective view with label cassette removed.
Figure 4:
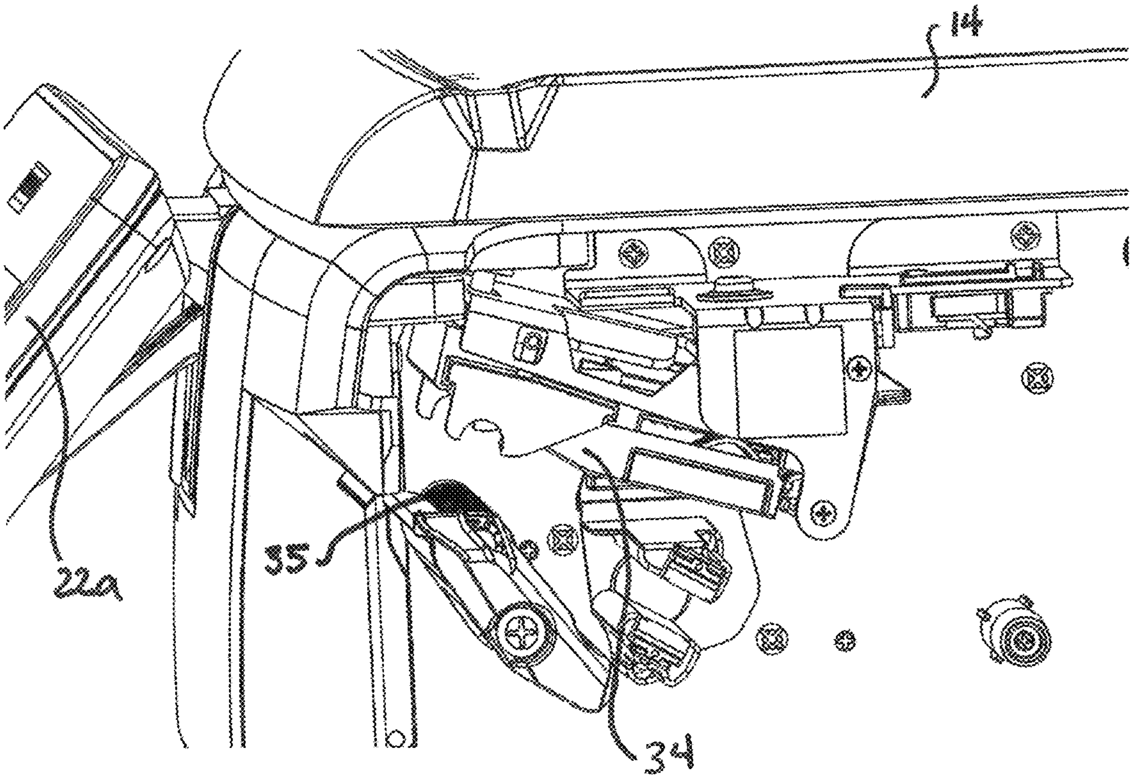
FIG. 4 shows a partial perspective of a printhead region within the cassette receiving station.

Referring to FIGS. 1-12, an exemplary scale configuration is shown. The scale 10 includes a weighing station 12, which in some embodiments may be formed by a weighing platter 14 that can be removed (e.g., for cleaning) from atop the scale body 16. A platter support bracket (not shown) transfers forces to a mechanism, such as a load cell 15 located internal of the scale body 16, for producing weight indicative signals when items are placed on the weighing station. An operator interface side 20 of the scale includes an operator interface 22 configured to display information associated with scale operations. By way of example, the operator interface 22 may be formed by a touch-screen display 22*a*. A customer interface side 24 of the scale includes a customer interface 26, which in certain embodiments may be formed by any suitable display screen technology.

Figure 5:
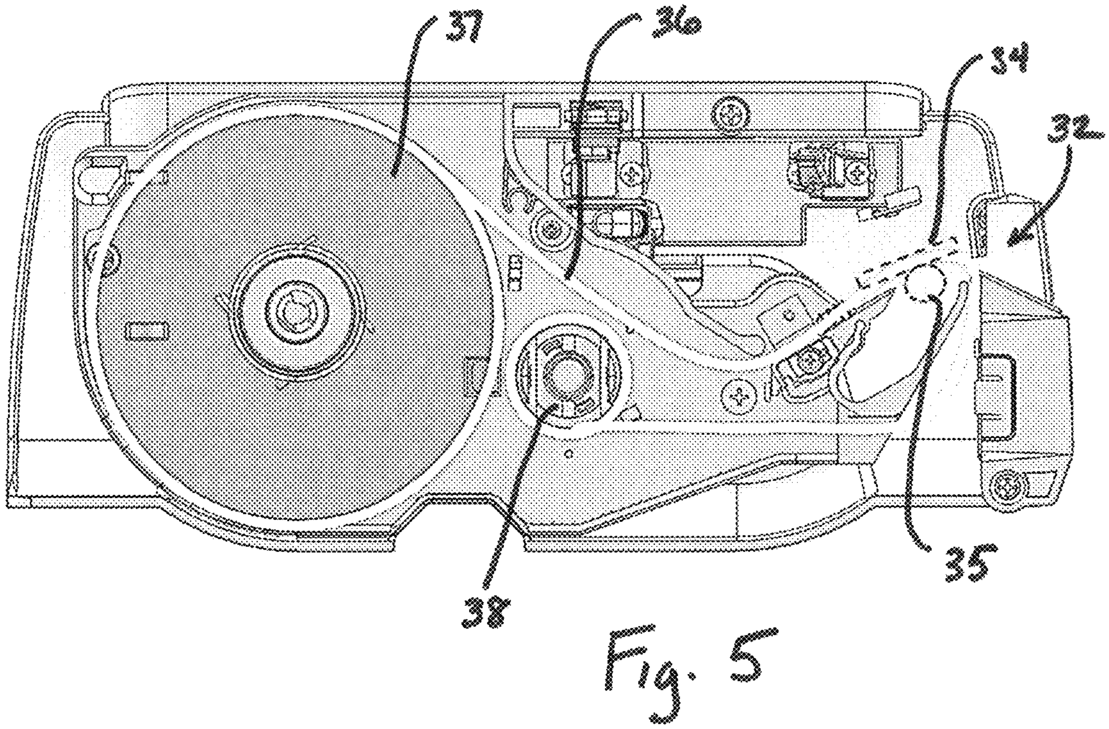
FIG. 5 shows a side elevation looking outward along the label cassette and showing an exemplary label stock path.
Figure 6:
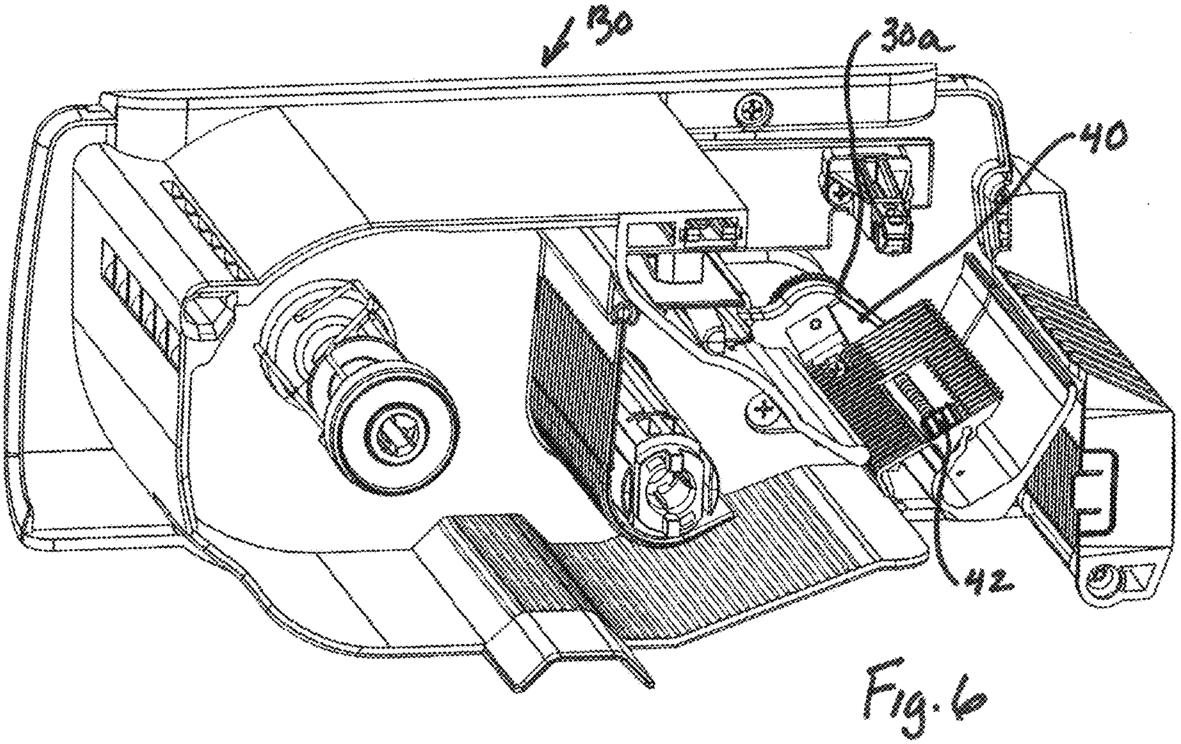
FIGS. 6-8 show perspective views of a label stock cassette or portions thereof.
Figure 7:
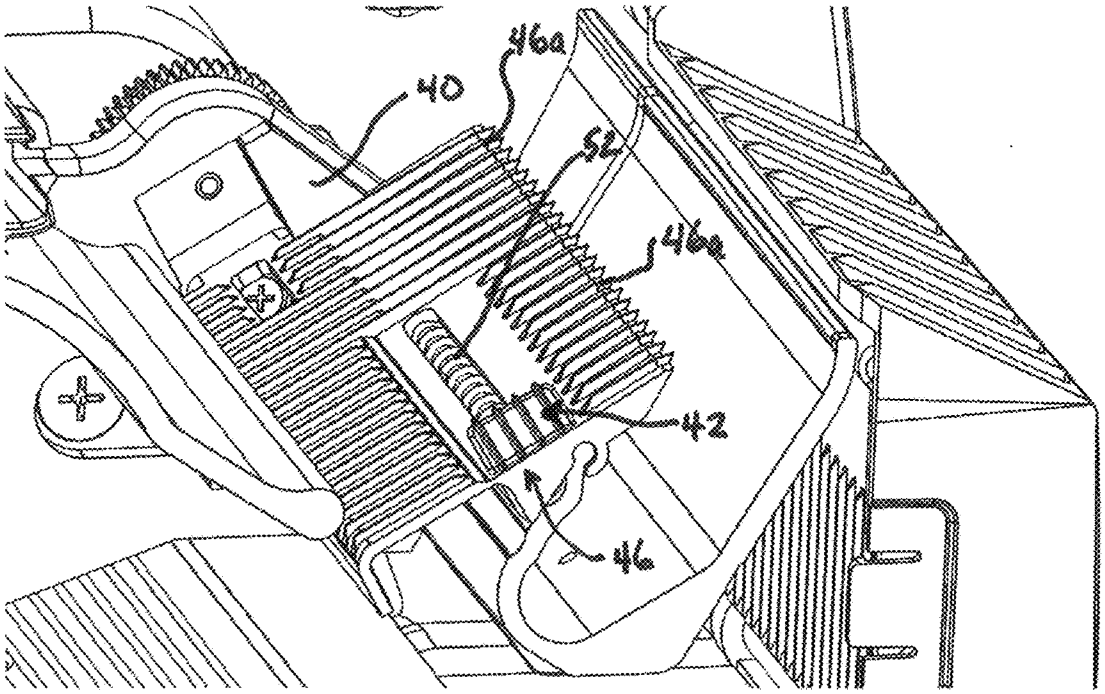
Figure 8:
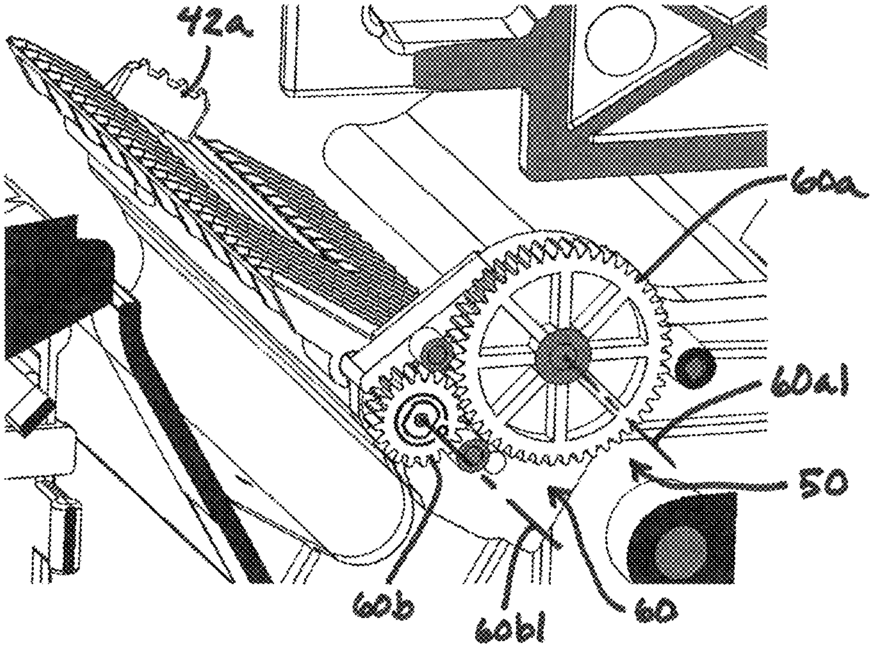
Figure 9A:
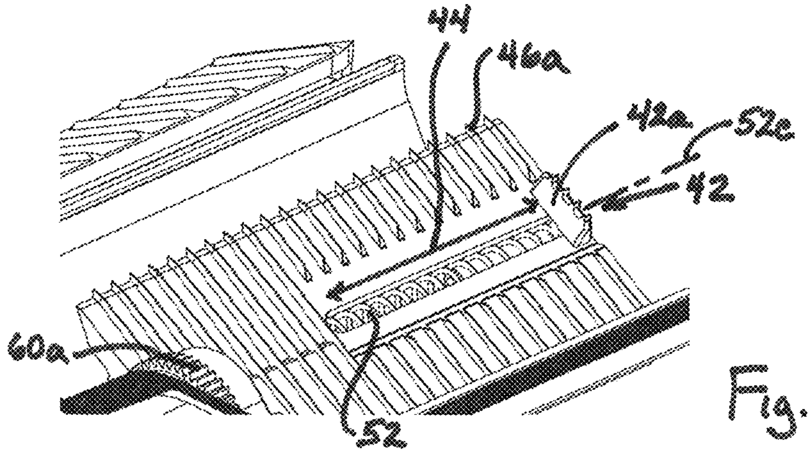
FIGS. 9A and 9B show the label stock edge guide in its two extreme positions.
Figure 9B:
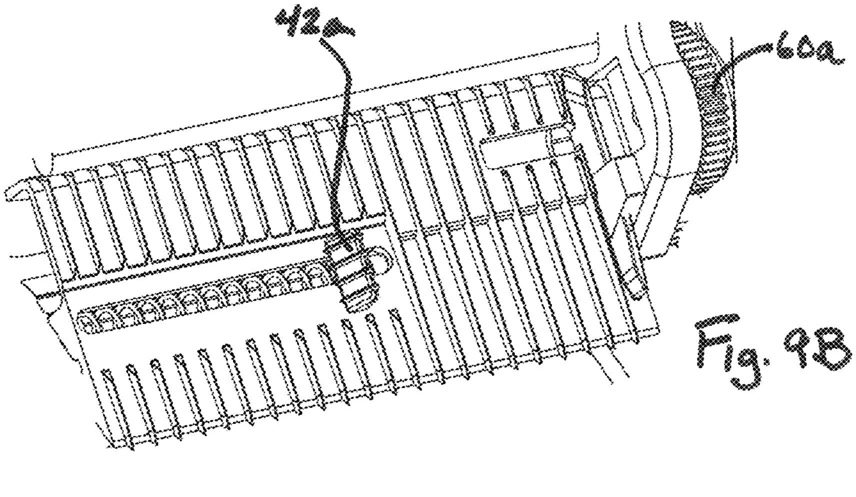
Figure 10:
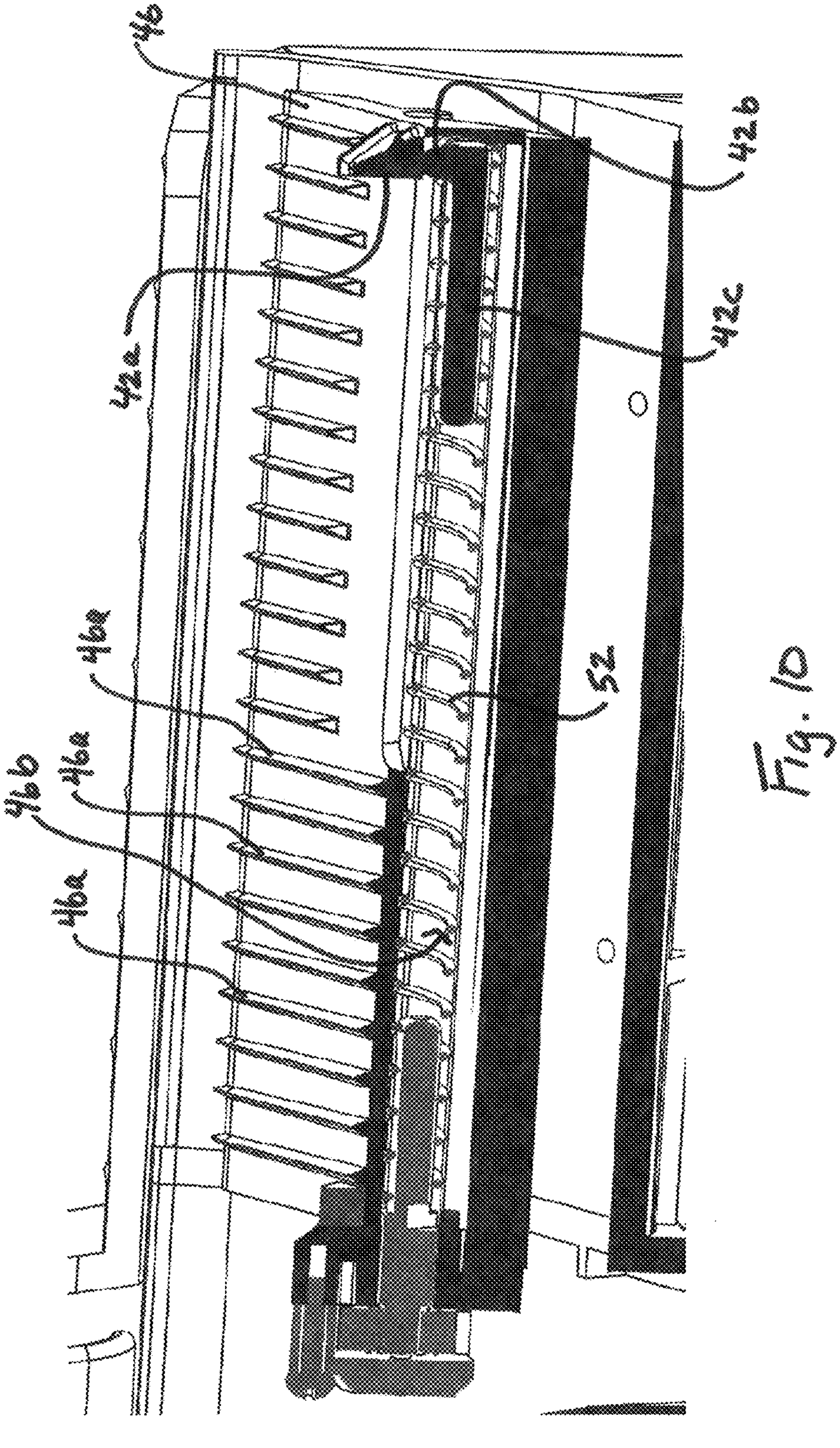
FIG. 10 shows a cross-section of a label stock guide region of the cassette.
Figure 11:
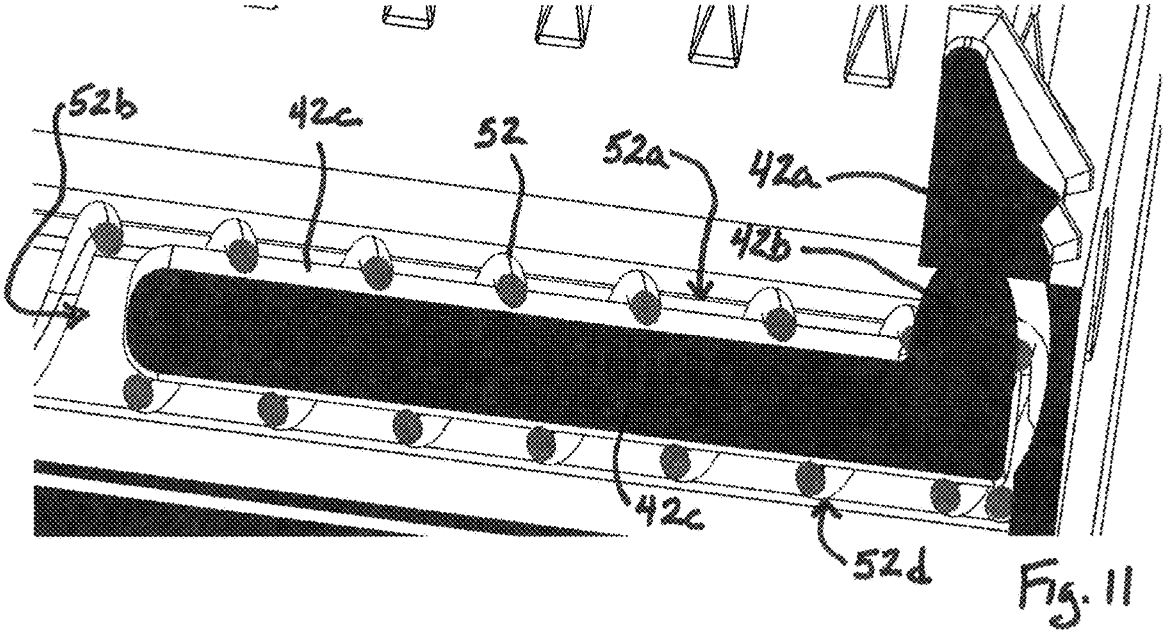
FIGS. 11 and 12 show enlarged portions of the cross-section of FIG. 10.
Figure 12:
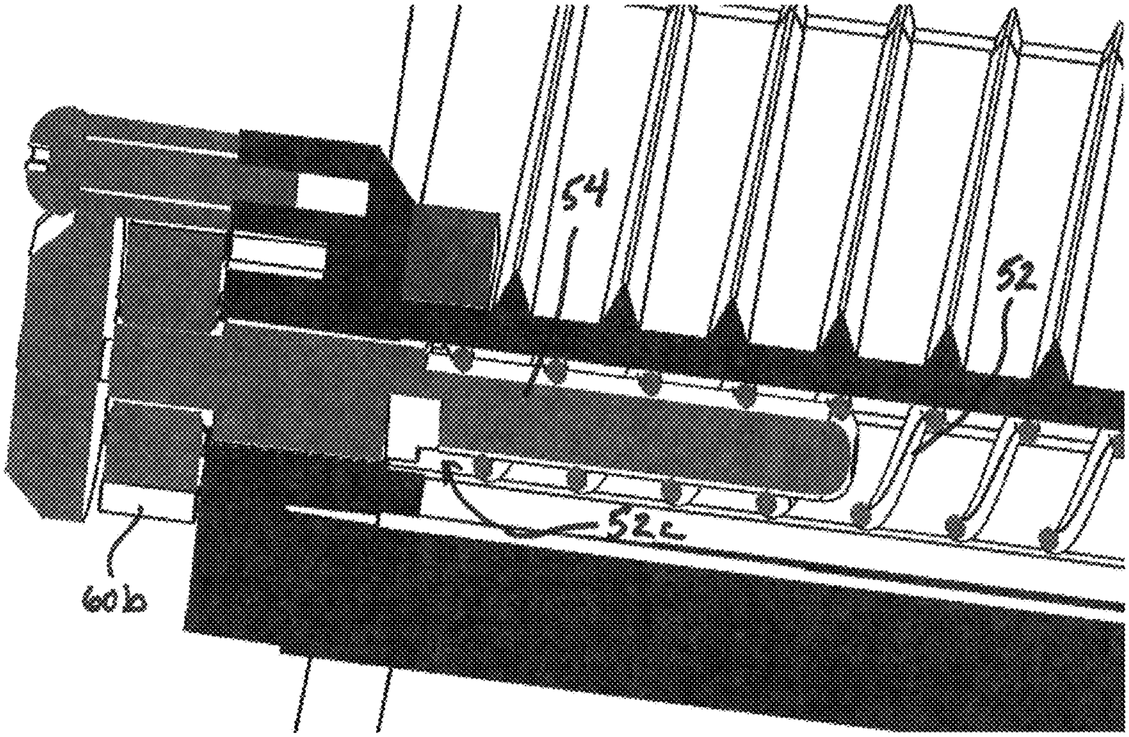

A side portion of the scale body incudes a cassette station 28 that receives a removable label stock cassette 30 that defines a label exit slot 32. A label printer (e.g., a printhead 34 and associated print roller 35) is located within the scale body and may use any suitable printing technology for printing on labels of a label supply roll 37 loaded in the cassette 30, which printed labels then exit the label exit slot 32 to be applied to products. FIG. 5 shows, along a view looking inward into the cassette station, a label stock path 36 for label stock that includes a liner that is taken up on a take-up reel 38, but linerless label stock could also be used. By way of example, the printhead 34 may be a thermal printhead for printing on thermal label stock.

Part of the label stock path 36 includes a side structure 40 defining one side of the part of the label stock path and a label stock edge guide 42 for defining an opposite side of the part of the label stock path. The label stock edge guide 42 is movable, per arrow 44, so as to adjust a spacing between the label stock edge guide 42 and the side structure 40 for accommodating different label stock widths. Typically, the label stock edge guide 42 is located in a region of the label stock path that is proximate the printhead, so as to help assure proper label stock position relative to the printhead during printing. Here, the label stock guide 42 moves along a platform structure 46 that defines multiple side-by-side ribs 46*a* over which the label stock moves. A guide adjustment assembly 50 is connected to the label stock edge guide 42 for providing tool-free manual movement of the position of the label stock edge guide to adjust the spacing between the label stock edge guide 42 and the side structure 40. Here, the side structure 40 is defined by a side surface portion of the housing 30*a* of the cassette 30.

In the illustrated embodiment, the guide adjustment assembly comprises a rotatable spring 52 which, here is positioned within a cylindrical passage 46*b* of the platform structure 46. The label stock edge guide 42 includes an edge guide portion 42*a* external of the spring 52 and configured for guiding label stock and a follower portion 42*b* engaged with the spring 52 to ride along a length of the spring when the spring is rotated, thereby causing similar movement of the edge guide portion 42*a* along the length of the spring 52. Here, the follower portion 42*b* is formed as a segment passing through a helically running gap 52*a* of the spring to an elongate portion 42*c* within a cylindrical passage 52*b* through the spring 52. The elongate portion 42*c* provides added stability both during movement and when the label stock edge guide 42 is stationary, and also supports the spring 52.

In the illustrated guide adjustment assembly a rotatable component, here the spring 52, defines a helical drive path, here the gap 52*a*. However, alternative structures to define the helical drive path are possible, such as a shaft with a helical groove therealong.

The guide adjustment assembly 50 includes a drive shaft 54, which is aligned with the spring, and the spring includes an end 52*c* connected to the drive shaft 54 for rotation with the drive shaft 54. The spring includes an opposite end 52*d* that is freely rotatable about the elongate portion 42*c*.

The guide adjustment assembly 50 further includes a gear train 60 including a thumbwheel gear 60*a* positioned and configured to permit manual rotation (by a users thumb) and a shaft drive gear 60*b*. The drive shaft 54 is connected (e.g., keyed) to the shaft drive gear 60*b* for rotation therewith. The gear train 60 is configured such that rotation of the thumbwheel gear 60*a* causes rotation of the shaft drive gear 60*b*, and thus rotation of the drive shaft 54 and spring 52. Here, a toothing of the thumbwheel gear 60*a* is engaged directly with a toothing of the drive shaft gear 60*b*, but arrangements with intermediate gears, or with a belt-type interconnection could be provided between a thumbwheel pully and a shaft drive pulley. In all such arrangements, the guide adjustment assembly is configured as an arrangement that converts a rotation of an adjustment component (e.g., the thumbwheel gear or pulley) into a linear movement of the label stock edge guide.

Here, the thumbwheel gear 60*a* (or other thumbwheel structure) includes an axis of rotation 60*a*1 that is offset from a rotation axis 52*e* of the spring (or other rotatable component), and the shaft drive gear 60*b* includes a rotation axis 60*b*1 that is aligned with the rotation axis 52*e*.

The guide adjustment assembly 50 is configured to prevent inadvertent movement of the label stock edge guide 42. In this regard, the force required to rotate the spring 52 may be established to prevent any such inadvertent rotation being caused by vibration or forces of the label stock against the edge guide.

In the illustrated embodiment, the side structure 40, the label stock edge guide 42 and the guide adjustment assembly 50 are formed on the label stock cassette 30. However, in some embodiments, the arrangement could be provided on a scale or other printer that does not utilize a cassette. Additionally, the arrangement could be employed in connection with medias other than label stock.

The guide adjustment system is relatively simple and cost-effective, while provide ease of operation by an end user, without requiring the use of tools.

It is to be clearly understood that the above description is intended by way of illustration and example only, is not intended to be taken by way of limitation, and that other changes and modifications are possible.

The invention claimed is:

1. A printer, comprising:

a media path along which labels are movable;

a printhead positioned along the media path;

wherein at least a part of the media path includes a side structure defining a first side of the part of the media path and a media edge guide for defining a second side of the part of the media path, wherein the media edge guide is movable so as to adjust a spacing between the media edge guide and the side structure for accommodating different media widths;

a guide adjustment assembly connected to the media edge guide for providing tool-free manual movement of a position of the media edge guide to adjust the spacing;

wherein the guide adjustment assembly comprises a rotatable component defining a helical drive path, wherein the media edge guide includes an edge guide portion configured for guiding media and a follower portion engaged with the helical drive path to ride therealong during rotation of the rotatable component forcing the edge guide portion to move along a length of the rotatable component;

wherein the rotatable component includes an internal passage and the media edge guide comprises an elongate portion that is located within and moves along the internal passage.

2. The printer of claim 1, wherein the rotatable component comprises a rotatable spring.

3. The printer of claim 2, wherein the guide adjustment assembly further comprises a drive shaft, wherein the spring includes a first end connected to the drive shaft for rotation therewith.

4. The printer of claim 3, wherein the guide adjustment assembly further comprises a gear train including a thumbwheel gear positioned and configured to permit manual rotation and a shaft drive gear, wherein the drive shaft is connected to the shaft drive gear for rotation therewith, wherein the gear train is configured such that rotation of the thumbwheel gear causes rotation of the shaft drive gear.

5. The printer of claim 4, wherein a toothing of the thumbwheel gear is engaged directly with a toothing of the drive shaft gear.

6. The printer of claim 3, wherein the spring includes a second end rotatable about an elongate component.

7. The printer of claim 2, wherein the follower portion comprises a segment passing through a helically running gap of the spring to the elongate portion.

8. The printer of claim 1, wherein the guide adjustment assembly further comprises a thumbwheel that is rotatable and operatively connected to the rotatable component such that rotation of the thumbwheel causes rotation of the rotatable component.

9. The printer of claim 8, wherein thumbwheel includes an axis of rotation offset from a rotation axis of the rotatable component, wherein the thumbwheel is operatively connected to the rotatable component by a further wheel that includes a rotation axis that is aligned with the rotation axis of the rotatable component.

10. The printer of claim 1, wherein the guide adjustment assembly is configured to prevent inadvertent movement of the media edge guide.

11. The printer of claim 1, wherein the printer comprises a body with a removable media cassette, wherein the side structure, the media edge guide and the guide adjustment assembly are formed on the media cassette.

12. The printer of claim 1, wherein the printer takes the form of a scale that also includes a weigh station for receiving items to be weighed and a load cell for outputting a weight indicative signal.

13. A printer, comprising:

a printer body;

a media cassette removable from the printer body, the media cassette comprising:

a media path along which labels are movable;

wherein at least a part of the media path includes a side structure defining a first side of the part of the media path and a media edge guide for defining a second side of the part of the media path, wherein the media edge guide is movable so as to adjust a spacing between the media edge guide and the side structure for accommodating different media widths;

a guide adjustment assembly connected to the media edge guide for providing tool-free manual movement of a position of the media edge guide to adjust the spacing, wherein the guide adjustment assembly comprises a rotatable spring.

14. The printer of claim 13, wherein the media edge guide includes an edge guide portion external of the spring and configured for guiding media and a follower portion engaged with the spring to ride along a length of the spring when the spring is rotated so as to cause movement of the edge guide portion along the length of the spring.

15. The printer of claim 14, wherein the guide adjustment assembly further comprises a drive shaft, wherein the spring includes a first end connected to the drive shaft for rotation therewith, wherein the guide adjustment assembly further comprises a gear train including a thumbwheel gear positioned and configured to permit manual rotation and a shaft drive gear, wherein the drive shaft is connected to the shaft drive gear for rotation therewith, wherein the gear train is configured such that rotation of the thumbwheel gear causes rotation of the drive shaft gear.

16. A printer, comprising:

a media path along which labels are movable;

a printhead positioned along the media path;

wherein at least a part of the media path includes a side structure defining a first side of the part of the media path and a media edge guide for defining a second side of the part of the media path, wherein the media edge guide is movable so as to adjust a spacing between the media edge guide and the side structure for accommodating different media widths;

a guide adjustment assembly connected to the media edge guide for providing tool-free manual movement of a position of the media edge guide to adjust the spacing;

wherein the guide adjustment assembly comprises a rotatable component defining a helical drive path, wherein the media edge guide includes an edge guide portion configured for guiding media and a follower portion engaged with the helical drive path to ride therealong during rotation of the rotatable component forcing the edge guide portion to move along a length of the rotatable component;

wherein the guide adjustment assembly further comprises a thumbwheel that is rotatable and operatively connected to the rotatable component such that rotation of the thumbwheel causes rotation of the rotatable component;

wherein thumbwheel includes an axis of rotation offset from a rotation axis of the rotatable component, wherein the thumbwheel is operatively connected to the rotatable component by a further wheel that includes a rotation axis that is aligned with the rotation axis of the rotatable component.

* * * * *